Feb. 8, 1944.   W. A. WEIGHTMAN   2,341,133
WELDING GUN
Original Filed Aug. 25, 1939
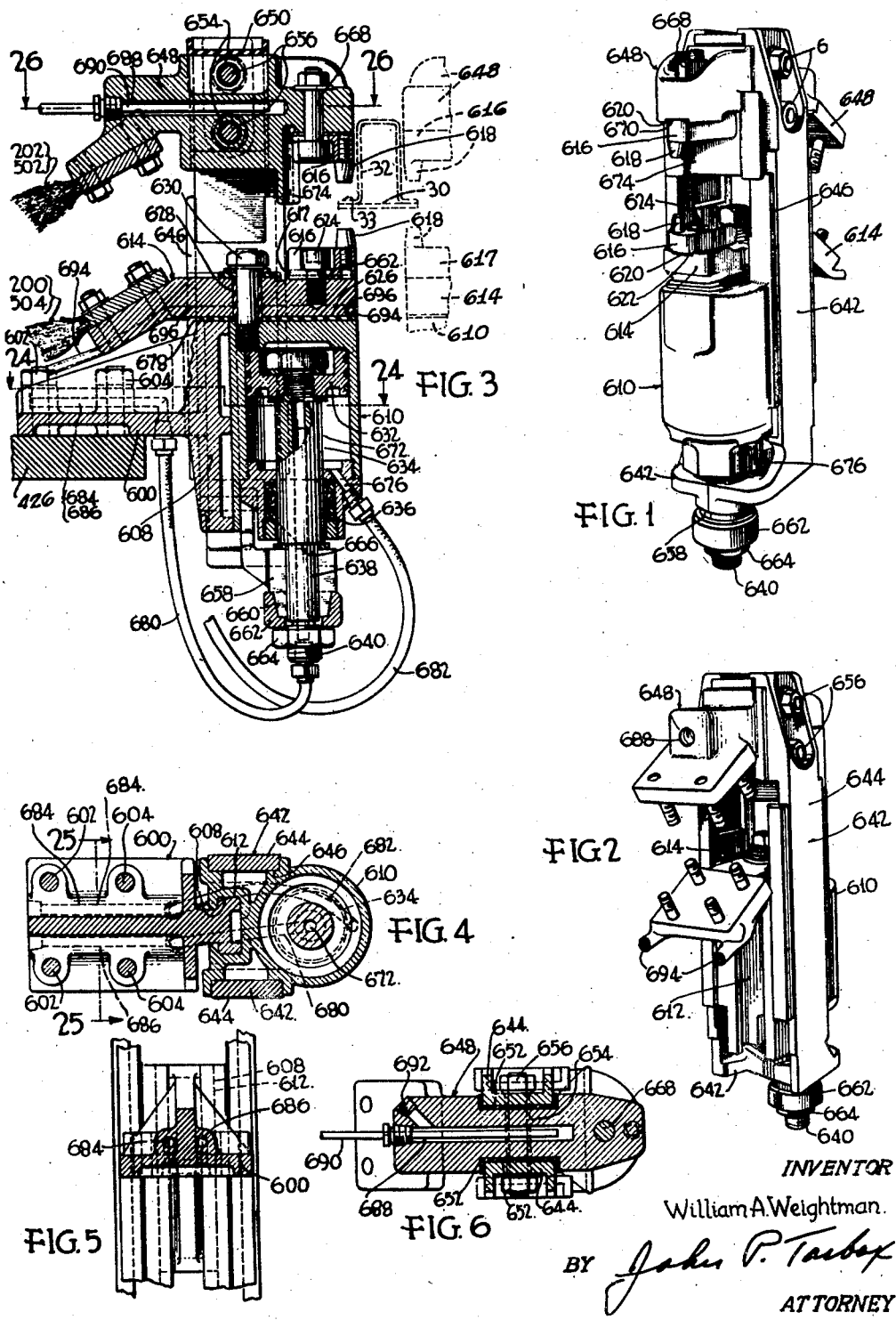
INVENTOR
William A. Weightman.
BY John P. Tarbox
ATTORNEY Patented Feb. 8, 1944

2,341,133

UNITED STATES PATENT OFFICE 2,341,133

WELDING GUN

William A. Weightman, Philadelphia, Pa., assignor to Edward G. Budd Manufacturing Company, Philadelphia, Pa., a corporation of Pennsylvania Original application August 25, 1939, Serial No. 291,838. Divided and this application August 27, 1941, Serial No. 408,418

16 Claims. (Cl. 219—4)

This invention relates to a welding gun and has for an object to provide an improved convenient and compact device of this class which may be quickly removed for servicing.

Another object of the invention is to provide an apparatus of the type described employing air pressure to establish the welding electrode pressures and in which the felding electrode pressure may be of the order of 1600 pounds.

Still another object of the invention is to provied an apparatus capable of forming a plurality of spot welds closely spaced on a curved member where the axis of the spot welds is normal to the curvature.

A still further object of the invention is to provide in such an apparatus a double-acting floating welding gun capable of effecting contact with the work with uniform pressure on each side and separating from the work after the weld is completed all in the fraction of a second The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

Figure 1 is a front and side perspective view of an individual sliding or floating welding gun.

Figure 2 is a rear and side perspective view of a welding gun.

Figure 3 is a longitudinal section through a welding gun, a structure to be welded and part of another opposite welding gun being indicated by dotted lines.

Figure 4 is a section taken on the line 24—24 of Figure 3 illustrating a cylinder, bracket and sliding guides.

Figure 5 is a section taken on the line 25—25 of Figure 4 and illustrating in elevation the sliding guides.

Figure 6 is a section taken on the line 26—26 of Figure 3 and illustrates the upper electrode support and cooling therefor.

This application is a division of applicant's application Serial No. 291,838, filed August 25, 1939, for "Press welding machine and method," now Patent No. 2,319,095, dated May 11, 1943.

Each welding gun is supported upon a bracket 600 secured by bolts 602 and 604 upon a table or block 426 of a machine structure such as disclosed in applicant's aforesaid parent application. The bracket is provided with a perpendicularly extending slide support or head 608 upon which is slidably supported a cylinder 610, the cylinder having integrally arranged therewith a complemental recess 612 adapted to slidably engage the support head. The cylinder at the head end thereof carries a welding electrode carrying block 614 having secured on one end thereof a welding electrode tip adaptor 616 having a welding electrode 618 threaded therein The other end of the block 614 is provided with one end of a flexible connector such as 504 or 200 as the case may be. The welding electrode adaptor 616 is preferably provided with a central rib 620 arranged in a groove 622 (Figure 1) in the electrode block 614 and is held in place by the screw 624 having a recess in the top thereof to receive a suitable wrench. The groove 622 in which projection 620 extends may be set at any angle in order to locate the electrode tip in a proper position and the adaptor may be slid to any desired position in the groove and thereafter tightened in place to likewise position the electrode. The electrode carrying block 614 is insulated from the cylinder by a layer of insulation 626 and insulation 628 surrounding a stud 630 (Figure 3) by which the block is secured to the cylinder head.

The cylinder is provided with a piston 632 having a hollow piston rod 634, the same extending outwardly through the bottom of the cylinder through a stuffing box 636. The lower end of the piston rod 634 is provided with a shank 638 and a threaded extremity 640 on which are positioned two halves of the lower end of a yoke 642 (Figs. 1, 2 and 4). The yoke comprises a pair of parallel straps 644 extending vertically in guide ways 646 arranged integrally with the cylinder structure and these straps are bolted together at the top around an upper electrode block 648, the same, however, being separated electrically from the electrode block through insulation 650, 652 and insulation sleeves 654 upon the bolts 656. The lower ends 658 of the yoke members 642 are secured together around the shank 638 of the piston rod by engaging a tapered lower portion 660 of the lower ends of the yokes with a tapered shell 662 adapted to be forced upward by the nut 664 upon the threaded end 640 of the shank 638, the lower ends of the yokes thereby being urged upwardly into engagement with the shoulder 666 formed by the end of the main portion of the piston rod and the shank 638. The upper electrode block 648 is provided with an electrode adaptor 616 having an electrode tip 618 therein and the electrode adaptor is secured to the block by a bolt and nut 668, the block having a groove 670 for receiving the projection 620 of the electrode adaptor.

Air is admitted to the top side of the piston into the cylinder through the central bore 672 of the piston rod and causes the piston to lower in the cylinder thereby sliding the yoke 642 in the guides 646 on the cylinder and bringing the upper electrode 618 into engagement with the flange 33 of the channel member 32. Thereafter continued pressure on the top side of the piston and urging against the upper end of the cylinder forces the cylinder to raise itself sliding upon the support guide head 608 thereby bringing the lower electrode 618 into engagement with the cap strip 30. Since the pressure employed is sufficient to establish a welding pressure between the electrodes, it will be seen that, except for the weight of the parts, the pressure on the upper electrode tip and the lower electrode tip is completely equalized by the sliding movement permitted between the upper electrode and its yoke and the cylinder and its slidable support. To prevent flash or molten metal from clogging the movement of the various slide members, the upper electrode block is provided with a shield 674 which cooperates with the lower electrode when the electrodes are in engagement so as to block the path of any metal exploded away from the workpiece toward the guide 646 and the yoke 642.

To separate the electrodes fluid pressure is admitted to the underside of the piston through the port 676 in the lower end of the cylinder thereby permitting the cylinder to lower away from the work piece until the lower welding block 614 strikes the guide head 608 at the point 678 and thereafter the piston is raised within the cylinder to a further extent to elevate the yoke and upper electrode tip 618 to the disengaged position. Because of the floating movement of both the cylinder and piston the air pressure connections are made thereto through flexible hoses 680 and 682 which flexible hoses are detachably secured to ports 684 and 686 extending through the support bracket 600. The upper electrode block 648 is suitably water cooled by a bore 688 leading thereinto and a concentric tube 690 leading substantially to the bottom of the bore, water being circulated through the tube 690 into the bore and thence out through the outlet 692. The lower electrode block is cooled by a copper water-carrying tube 694 lying in a U-shaped groove 696 extending around the edge and the underside of the electrode block 614.

By reason of the construction described it will readily appear that upon the disablement of any gun, the same may be quickly substituted by another gun without great loss of time by simply sliding the cylinder and piston and its yoke from the supporting bracket 608 after disconnection of the electrical connections, air connections and water cooling connections. Likewise electrode tips may be quickly replaced by merely unscrewing the tip from its adaptor and if difficulty results from removing the tip from the adaptor, the adaptor may be removed from its block by loosening its associated threaded fastening means, it being understood that the adaptor engages the threaded fastening means with a U-slot 617.

It will be understood that the electrode supporting blocks are constructed of a metal high in electrical conductivity as well as strength and that the electrode tips themselves may be made of a special alloy such as Mallory metal. The yokes in order to supply sufficient strength are preferably made of stainless steel and the parts in general around the gun are of such materials as would be non-magnetic and unaffected by the heavy currents and magnetic fields produced thereby.

When fluid pressure is admitted to one side of the piston, the mechanism for controlling such pressure automatically provides for releasing the pressure from the opposite side of the piston. Due to the guns being longer below the work, than above, the center of gravity of each gun is below the work and they may be placed closer together on work that is longitudinally curved downward than on upwardly curved work.

This invention relates principally to apparatus having spot welding electrodes of the floating type, that is, in which each electrode is adapted to be movable so that where a number of pairs of separate electrodes are used, as in spot welding, the pressure transmitted to the work by each pair of electrodes will be uniform with the pressure transmitted by each other pair of electrodes to obtain uniformity in the work irrespective of whether the work be of precisely uniform thickness and whether the electrodes are each of exactly the same length.

Each welding gun contains a fluid pressure device, and is compact since the pressure piston and cylinder are arranged vertically within the gun for direct cooperation with the welding electrodes to avoid any diminution in the power transmitted to the electrodes by the fluid pressure piston and cylinder. The ease of removing any gun upon removal of the electrical and fluid pressure connections aids the rapid operation and servicing of this device.

The gun is removable from its upstanding supporting guide 608 by sliding it upwardly after removal of the electrical and fluid connections. Above 678 this upstanding guide should be substantially longer than the maximum separation of the welding electrodes in order that the gun may not be removed from this upstanding guide in event the work should be located close to the upper electrode where the electrodes are spaced apart a maximum amount. As the electrodes close, the weight of the gun is transferred from the abutment 678 to the work and the upper electrode as soon as the lower electrode begins to move toward the work after impingement of the upper electrode upon the work.

I claim:

1. A welding gun having opposite electrodes, parallel guides along which each electrode is slidable, and means for moving each electrode toward and from and with respect to the work, one of said guides constituting a support for said gun and along which the gun is moved as a unit on insertion of the gun in operative position and on removal of the gun from such position, cooperating means on said support and said gun for supporting the latter in a rest position when the electrodes are out of engagement with the work.

2. A welding gun having an upstanding guide along which the gun is slidable for movement to and from its operative position, a pair of opposite electrodes each of which is movable with respect to the work, support means on said guide for supporting said gun when the electrodes are out of contact with the work, means for moving the upper electrode contiguous the work, and means for raising the lower electrode and simultaneously changing the weight of said gun from said support means to the work, whereby the work assists in the support of the gun during welding, each of said means being constructed to apply uniform pressures on the electrodes except for the weight of the gun.

3. A spot welding gun having an upstanding guide along which the gun is slidable for movement to and from its operative position, a pair of opposite electrodes each of which is movable with respect to the work, support means on said guide for supporting said gun when the electrodes are out of contact with the work, a piston and cylinder each supporting an electrode, one of said piston and cylinder being slidable along said guide above said support means for moving its electrode into contact with the work, a second guide fixed with respect to said one and along which the other of said piston and cylinder and its electrode is movable into contact with the work.

4. The method of supporting a spot welding gun to insure freedom of floating to its opposite electrodes when the center of gravity of said gun is below the work which comprises supporting the gun independently of the work, lowering its upper electrode into contact with the work, and then transferring the weight of the gun from its support to said upper electrode and work simultaneously with raising the lower electrode into contact with the work, and uniformly pressing both electrodes against the work during welding except for the weight of the gun being on the upper electrode.

5. In a welding gun having a pair of electrodes adapted to move toward and away from one another under pressure, a bracket for one of said electrodes, guideways in the opposite sides of said bracket, a split yoke, having a portion slidable in each guideway and carrying said other electrode at the loop end thereof, a cylinder in said bracket, a piston in the cylinder, having a piston rod extending through the end of the cylinder and means for clamping the split ends of said yoke around the end of said piston rod whereby to move said electrodes into and out of engagement with the work.

6. In a welding gun, a holder for one electrode of a pair of coacting electrodes, a connecting member attached to said holder at one end and insulated therefrom, a support for the other electrode of said pair of electrodes, at least one guideway in the side of said support for slidably receiving said connecting member, motor means secured to said support and to the other end of said connecting member to reciprocate said member relative to said electrode support.

7. In a welding gun, a holder for one electrode of a pair of coacting electrodes, a connecting member attached to said holder at one end and insulated therefrom, a support for the other electrode of said pair of electrodes, at least one guideway in the side of said support for slidably receiving said connecting member, motor means secured to said support and to the other end of said connecting member to reciprocate said member relative to said electrode support and means to slidably mount said support for movement substantially parallel to said guideway.

8. A welding gun having opposite electrodes, a guide on which the gun is mounted and along which it is slidable for removal, a fluid pressure cylinder at one side of said guide, a piston and piston rod in said cylinder, guides arranged one on each side of said cylinder, yoke members slidable in said guides and connected together adjacent each end of said cylinder, means adjacent one end of said cylinder for connecting said yoke members to said piston rod, an electrode secured to said cylinder at the end thereof opposite that adjacent which said yoke members are connected to said piston rod, the opposite electrode being carried by said yoke members with the cylinder secured electrode between the opposite electrode and said cylinder and piston.

9. A welding gun having opposite electrodes, an upstanding guide on which the gun is mounted and along which it is slidable as the lower electrode is moved into cooperation with the work, a fluid pressure translating device for moving each electrode toward the work, said lower electrode being fixed with respect to one portion of said device and the upper electrode being fixed with respect to another portion of the device that is relatively removable with respect to the first portion, another guide parallel to the first mentioned guide and along which the upper electrode is movable, said gun being removable by sliding the same up the first guide, an abutment on the first guide for supporting said gun when not welding, said fluid pressure device being constructed to lower the upper electrode into contact with the work by movement along said second guide and then move the lower electrode into contact with the work after the said gun and device are raised along the first guide, the work carrying the gun during welding, and the first guide being longer than the maximum separation of said electrodes whereby the gun is prevented from sliding off said first guide in event the work were located close to the upper electrode when said electrodes are widely separated.

10. In a welding device, a pair of coacting electrodes, supports for said electrodes, guiding means having complementary parts with sliding surfaces for at least one of said electrodes adapted to allow relative movement between said electrodes toward and away from each other, said guiding means extending close to and along the gap between the tips of said electrodes, the part of said guiding means which is connected to one of said electrode supports extending at least partly along the aforesaid space on the outside of the complementary part of said guiding means so as to protect the sliding surfaces of the guiding means against splash during welding.

11. A welding gun having opposite electrodes and supports therefor, a pair of spaced guides, a member slidable along said spaced guides and secured to one electrode support, another guide intermediate the spaced pair and along which the other electrode support is slidable, and fluid pressure means for sliding each electrode support along its guideway.

12. A welding gun having opposite electrodes, a fixed support for the gun, means for moving one electrode into cooperation with the work, means for moving the second electrode into cooperation with the work after the first electrode has engaged the work, a shield secured adjacent the first electrode extending toward the second electrode a greater distance than does the first electrode and a greater distance beyond the first electrode than the thickness of the work, and means for moving the second electrode away from the work before the first electrode is withdrawn therefrom whereby said shield is in place before both electrodes engage the work and is removed after one electrode has been disengaged therefrom.

13. A spot welding gun having opposite electrodes each movable toward and from work to be welded, a guide, a pressure-exerting device formed of two relatively movable inner and outer parts, the outer part having closed and open ends, with the inner part extending into the outer part through the open end thereof, and one of said electrodes having attachment to the closed end of the outer part, slide ways on the outer surface of said outer part, and sliders movable in said slide ways and connecting said inner part, at the open outer part end with the other of said electrodes.

14. A floating welding gun comprising a support, a welding electrode slidably mounted upon said support for movement generally in the direction of the axis of the electrode, a second welding electrode slidably mounted with respect to said support for similar movement and means for moving said electrodes with substantially equal force into engagement with a work piece, said means including a cylinder having outer axially aligned side slide ways, and a piston, one end of said cylinder being closed and one of said electrodes being mounted upon said cylinder near the closed end thereof, the other one of said electrodes being connected to said piston by a structure extending through the other open end of said cylinder and along the outside thereof.

15. A welding gun comprising a support, a guide mounted on said support, a device movably supported in said guide, said device having two parts each freely and unopposedly movable relatively to the other, an electrode secured to each part of said device in cooperative relationship with each other, and pressure means for forcing said device parts towards and from each other in a time sequence.

16. A welding gun having a normally vertical position of operation comprising a support, an approximately vertical guide mounted on said support, a device mounted for up and down movement in said guide, said device having two parts and an electrode secured to each part of said device in cooperating relationship with each other, and pressure means for positively forcing said device parts toward and from each other in a time sequence.

WILLIAM A. WEIGHTMAN.